B. T. CURRIER.
Corn Harvester.
No. 24,994.  Patented Aug. 9, 1859.
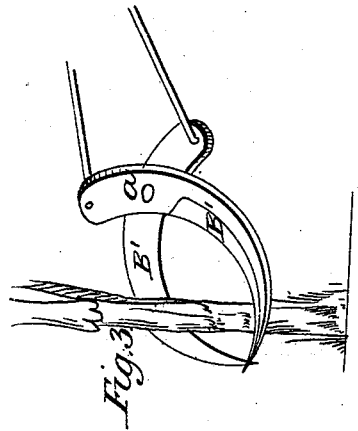
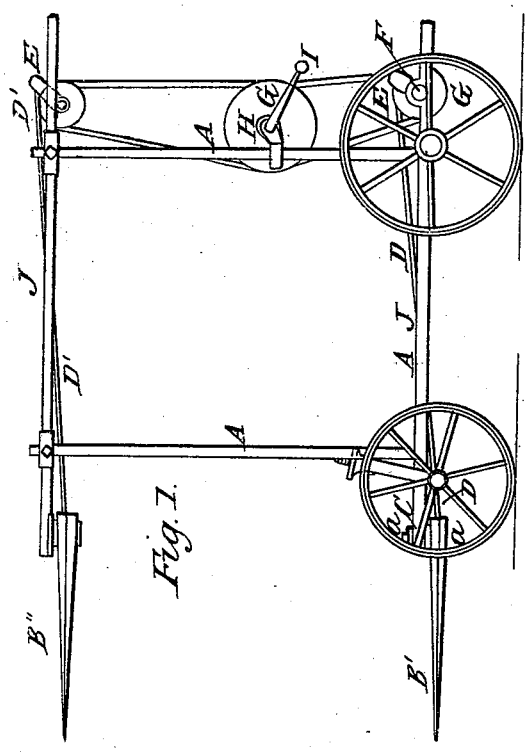
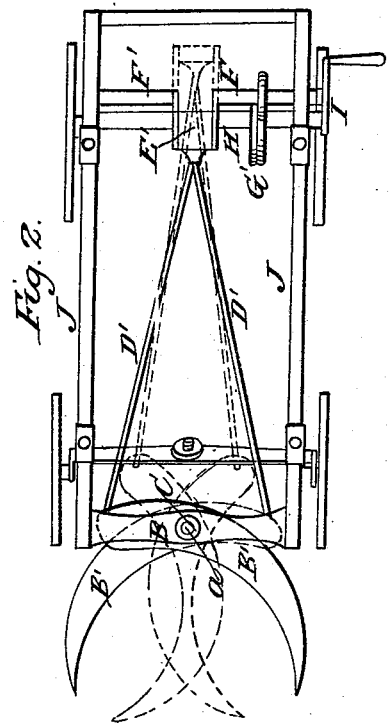
Witnesses:
M. C. W. Hughes
Wm Singleton
Inventor:
B. T. Currier

UNITED STATES PATENT OFFICE.

B. T. CURRIER, OF BATH, MAINE.

IMPROVEMENT IN CORN-HARVESTERS.

Specification forming part of Letters Patent No. 24,994, dated August 9, 1859.

*To all whom it may concern:*

Be it known that I, B. T. CURRIER, of Bath, in the county of Sagadahoc and State of Maine, have invented a new and useful Improvement in Corn and Cane Harvesters; and I do hereby declare that the following a full, clear, and exact description of the same, reference being had to the accompanying drawings, and to the letters of reference marked thereon, of which—

Figure 1 is a side elevation of the machine. Fig. 2 is a plan view of the same, showing the cutters in an open and closed state. Fig. 3 exhibits a view of the knife in the act of cutting the stalk.

My invention is more particularly intended for cutting the stalks of sugar-cane, which, from the peculiar character of the stalk, requires to be held steady and firm while being cut. For this purpose I construct a suitable frame, A, mounted upon wheels, and having a cross-piece, B, fixed to the front of this frame, in the center of which piece are two scythe-shaped cutters, B', pivoted together, like a pair of shears, at $a$, and secured to the piece B by a nut, C. The blades of these cutters are made of sufficient strength to withstand the necessary degree of strain for severing the stalk. The object of giving to these blades a curved shape is to dispense with the rotating gatherers commonly employed for holding the stalk to the knife while in the act of cutting while at the same time I effect an equally important object in severing the stalk by a double draw cut, the blades from their peculiar action cutting on both sides of the stalk at the same time and holding it in place while the cutting is performed. For operating these cutters two rods, D D, are attached to their arms and proceed to the rear of the machine, where they are attached to a crank, E, upon shaft F, having its bearings on each side of the frame A. A pulley, G, is keyed to this shaft, which operates the crank-shaft F by a belt which passes over it and around a driving-pulley, G', fixed upon a shaft, H, which is operated with a crank-handle, I, by hand-power. Motion being thus communicated to the crank E, it is transmitted to the cutters with a power and swiftness sufficient to effect the cutting of the stalk. Four standards, which constitute a part of the frame A, project out a suitable distance above the platform, which serve as supports for the frame J. This frame carries the upper cutters, B''. These, being similar in every respect to those just described, are operated by connecting-rods D' D', attached to a crank, E', upon shaft F', which is operated by a belt passing over the driving-pulley G'. The frame J is vertically adjustable, so as to be raised or lowered to the various heights of cane to be cut. The platform or frame A is also adjustable.

It is intended to operate this machine by hand and to stop its motion forward while the stalk is being cut. It is both light and portable, at the same time strong and efficient in its operation. The blades can be readily detached for sharpening or cleaning.

What I claim as new, and desire to secure by Letters Patent, is—

The arrangement and combination of the scythe-shaped cutters B' B'', rods D D', cranks E E', adjustable frame J, and standards A, as and for the purposes herein shown and described.

B. T. CURRIER.

Witnesses:
MICH. HUGHES,
M. M. LIVINGSTON.